United States Patent
Kim

(10) Patent No.: US 8,402,050 B2
(45) Date of Patent: Mar. 19, 2013

(54) APPARATUS AND METHOD FOR RECOGNIZING OBJECTS USING FILTER INFORMATION

(75) Inventor: Nam-Seok Kim, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/034,455

(22) Filed: Feb. 24, 2011

(65) Prior Publication Data

US 2012/0041971 A1    Feb. 16, 2012

(30) Foreign Application Priority Data

Aug. 13, 2010    (KR) .................. 10-2010-0078462

(51) Int. Cl.
*G06F 7/00* (2006.01)
*G06F 17/30* (2006.01)

(52) U.S. Cl. ......... 707/769; 715/204; 715/240; 715/247

(58) Field of Classification Search .................. 707/769; 715/204, 240, 247
See application file for complete search history.

(56) References Cited

U.S. PATENT DOCUMENTS

| | | | | |
|---|---|---|---|---|
| 5,751,289 A | * | 5/1998 | Myers ........................... | 345/419 |
| 2002/0105589 A1 | * | 8/2002 | Brandenberger et al. ..... | 348/360 |
| 2002/0124115 A1 | * | 9/2002 | McLean et al. ............... | 709/310 |
| 2004/0086184 A1 | * | 5/2004 | Kondo et al. ................. | 382/203 |
| 2006/0228040 A1 | * | 10/2006 | Simon et al. .................. | 382/254 |
| 2008/0095447 A1 | * | 4/2008 | Fukuyama et al. ........... | 382/209 |
| 2008/0252527 A1 | * | 10/2008 | Garcia ........................... | 342/450 |
| 2009/0102859 A1 | * | 4/2009 | Athsani et al. ................ | 345/619 |
| 2009/0167787 A1 | * | 7/2009 | Bathiche et al. .............. | 345/633 |
| 2009/0169107 A1 | * | 7/2009 | Chien et al. ................... | 382/190 |
| 2009/0215471 A1 | * | 8/2009 | Sands et al. ................... | 455/457 |
| 2010/0005397 A1 | * | 1/2010 | Lanahan et al. .............. | 715/747 |
| 2010/0177122 A1 | * | 7/2010 | Netter et al. .................. | 345/672 |
| 2010/0309225 A1 | * | 12/2010 | Gray et al. ..................... | 345/633 |
| 2010/0325154 A1 | * | 12/2010 | Schloter et al. ............... | 707/770 |
| 2011/0137894 A1 | * | 6/2011 | Narayanan et al. ........... | 707/723 |
| 2011/0165893 A1 | * | 7/2011 | Hyung et al. .................. | 455/457 |
| 2011/0200120 A1 | * | 8/2011 | Lareau et al. ............. | 375/240.26 |
| 2011/0216088 A1 | * | 9/2011 | Leung ........................... | 345/633 |
| 2011/0216179 A1 | * | 9/2011 | Dialameh et al. .............. | 348/62 |
| 2011/0221771 A1 | * | 9/2011 | Cramer et al. ................ | 345/633 |
| 2011/0279445 A1 | * | 11/2011 | Murphy et al. ............... | 345/419 |
| 2011/0283223 A1 | * | 11/2011 | Vaittinen et al. .............. | 715/781 |
| 2012/0011142 A1 | * | 1/2012 | Baheti et al. .................. | 707/769 |
| 2012/0038668 A1 | * | 2/2012 | Kim et al. ..................... | 345/633 |

FOREIGN PATENT DOCUMENTS

| | | |
|---|---|---|
| CN | 1674035 | 9/2005 |
| CN | 101216841 | 7/2008 |
| CN | 101977646 | 2/2011 |
| CN | 102436663 | 5/2012 |
| JP | 08-287216 | 11/1996 |

(Continued)

*Primary Examiner* — Wilson Lee
*Assistant Examiner* — Jessica N Le
(74) *Attorney, Agent, or Firm* — H.C. Park & Associates, PLC

(57) ABSTRACT

An object recognition method using filter information includes acquiring object image information including an object of interest, acquiring filter information for recognizing the object of interest from the object image information, and recognizing the object of interest using the filter information. An object recognition apparatus using filter information including an object information acquiring unit to acquire object image information comprising an object of interest, a filter information input unit to acquire filter information, an output unit to output the image information and the filter information, and a controller to recognize the object of interest in the object image information using the filter information.

15 Claims, 7 Drawing Sheets

FOREIGN PATENT DOCUMENTS

| | | |
|---|---|---|
| KR | 10-2005-0008245 | 1/2005 |
| KR | 10-2006-0070002 | 6/2006 |
| KR | 10-2009-0087332 | 8/2009 |
| KR | 10-0918392 | 9/2009 |

* cited by examiner

510

APPARATUS AND METHOD FOR RECOGNIZING OBJECTS USING FILTER INFORMATION

CROSS-REFERENCE TO RELATED APPLICATION

This application claims priority from and the benefit under 35 U.S.C. §119(a) of Korean Patent Application No. 10-2010-0078462, filed on Aug. 13, 2010, which is incorporated by reference for all purposes as if fully set forth herein.

BACKGROUND

1. Field

The following description relates to an Augmented Reality (AR) apparatus and method for recognizing objects.

2. Discussion of the Background

Augmented Reality (AR) is a computer graphic technique of synthesizing a virtual object or virtual information with a real environment such that the virtual object or virtual information appears like a real object or real information that may exist in the real world environment.

AR is characterized in synthesizing virtual objects based on the real world to provide additional information that cannot be easily obtained from the real world, unlike existing Virtual Reality (VR) that targets only virtual spaces and virtual objects. Based on this characteristic of AR, the AR can be applied to various real environments unlike the existing VR that has been applied to limited fields such as games. AR's characteristic has allowed the AR technology to come into the spotlight as a next-generation display technique suitable for a ubiquitous environment.

For example, AR may be implemented as a method of overlapping information on an image of the real world. If a tourist points at a specific direction with a camera of a mobile phone in which a GPS sensor is installed, AR data related to the various restaurants or stores on sale located on a street within a real world image of the street captured by the mobile phone may be displayed.

In order to provide such AR data, objects that exist in the real world may be recognized. That is, the ability to recognize stores or specific items from which AR data has to be obtained is a factor in an AR technology.

Conventional recognition techniques could recognize pre-designated markers, but there were difficulties in ensuring a high recognition rate using a makerless-based recognition technique such as detection of edges and boundaries. In order to provide a more effective AR service, improvement of such a markerless-based recognition technique may be developed.

Furthermore, the conventional recognition techniques could not easily detect objects of interest from image information in which multiple objects are included. Also, the conventional recognition techniques may recognize objects in which a user is not interested and provide metadata related to the unintended objects, which may undesirably consume processor or time resources. Additionally, a large amount of time may be undesirably consumed to find a desired object among similar prestored objects to identify the recognized object.

SUMMARY

Exemplary embodiments of the present invention provide an apparatus to recognize objects using filter information. Exemplary embodiments of the present invention also provide a method for recognizing objects using filter information.

Additional features of the invention will be set forth in the description which follows, and in part will be apparent from the description, or may be learned by practice of the invention.

Exemplary embodiments of the present invention provide an object recognition apparatus using filter information including an object information acquiring unit to acquire object image information including an object of interest; a filter information input unit to acquire filter information, the filter information to recognize, an object of interest from the image information; and a controller to recognize the object of interest in the object image information using the filter information.

Exemplary embodiments of the present invention provide an object recognition apparatus using filter information including an object information acquiring unit to acquire image information comprising an object of interest; a filter information input unit to acquire filter information, the filter information to recognize an object of interest from the image information; an output unit to output the image information and the filter information; an object recognition information storage to store reference characteristic information; a meta data storage to store detailed information related to the object in interest; and a controller to recognize the object of interest in the image information using the filter information and the reference recognition information.

Exemplary embodiments of the present invention provide a method for recognizing objects using filter information including acquiring object image information including an object of interest; acquiring filter information for recognizing the object of interest from the object image information; and recognizing the object of interest using the filter information.

It is to be understood that both forgoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
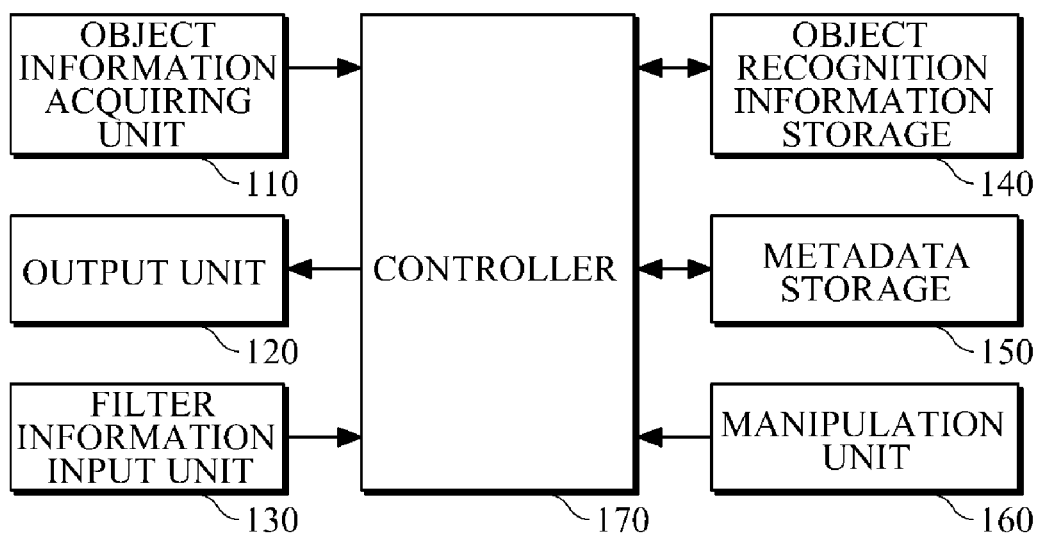
FIG. 1 is a diagram illustrating an object recognition apparatus using filter information according to an exemplary embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

FIG. 1 is a diagram illustrating an object recognition apparatus using filter information according to an exemplary embodiment of the invention.

Referring to FIG. 1, the object recognition apparatus includes an object information acquiring unit 110, an output unit 120, a filter information input unit 130, an object recognition information storage 140, a controller 170, and may further include a meta information storage 150 and a manipulation unit 160.

Figure 3:
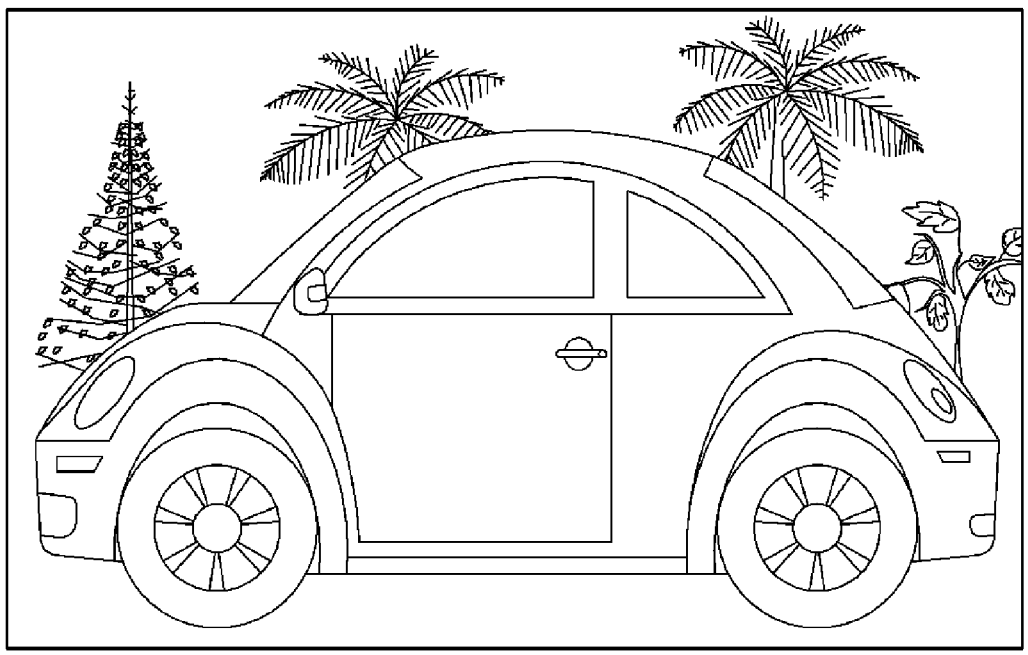
FIG. 3 illustrates an object information image according to an exemplary embodiment of the invention.
Figure 6:
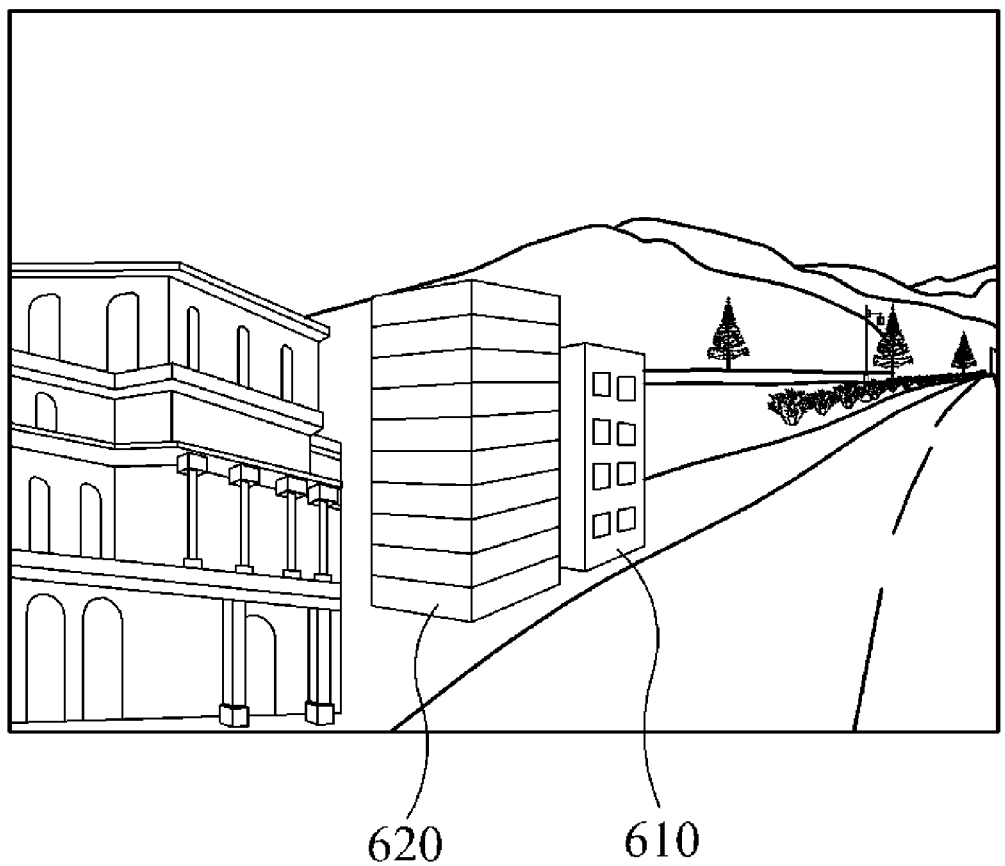
FIG. 6 illustrates an object information image according to an exemplary embodiment of the invention.

The object information acquiring unit 110 is used to acquire object information including at least one object of interest that exists in a real environment. The object information may include image information, location information, acoustic information, and the like. In an example, the object of interest may be a thing, a person, a state or a marker that exists in a real world, specific locations, climate, speed, visual data, auditory data, olfactory data, and the like. Accordingly, the object information acquiring unit 110 may include a camera or image sensor to acquire and output images including objects of interest, a microphone to acquire sounds, a speaker to output sounds, an olfactory data sensor, a GPS sensor, a Geo-magnetic sensor, or a speed sensor. Examples of object information images received through the object information acquiring unit 110 are illustrated in FIG. 3 and FIG. 6.

Although not shown in the drawings, the object information acquiring unit 110 may be implemented by a communication interface or function to acquire object information stored in a memory. For example, the object information acquiring unit 110 may acquire information regarding a current location of a user using a GPS sensor by detecting map information corresponding to the current location information as object information, and then transfer the object information to the controller 170.

The output unit 120 outputs control signals and various data transferred from the controller 170. In an example, the output unit 120 may include a display for outputting visual data, a speaker for outputting acoustic data in the form of audible sounds, or the like. According to an example, the output unit 120 may output image information acquired from the object information acquiring unit 110, filter information received through the filter information input unit 130, metadata, and user interface information to the controller 170 for processing.

The filter information input unit 130 is used to obtain filter information of an object of interest from the acquired object information. For example, the filter information input unit 130 may be an input unit which generates filtered data if a trigger is pressed. The trigger may be a touch sensor, a mouse, a microphone which acquires acoustic data, or the like.

The filter information may be provided in various forms. In an example, filter information may include outline image data, attributes, location information of the object of interest and the like. More specifically, the filter information may be an outline image data showing the outline of an object of interest among a plurality of overlapping objects on a displayed image (see FIG. 4), detailed information of an object of interest such as the manufacturer of the object of interest, or location information of the object in interest such as a national park. For example, in the case of object information illustrated in FIG. 3, filter information may be a trademark of a car, such as "Volkswagen™."

Figure 4:
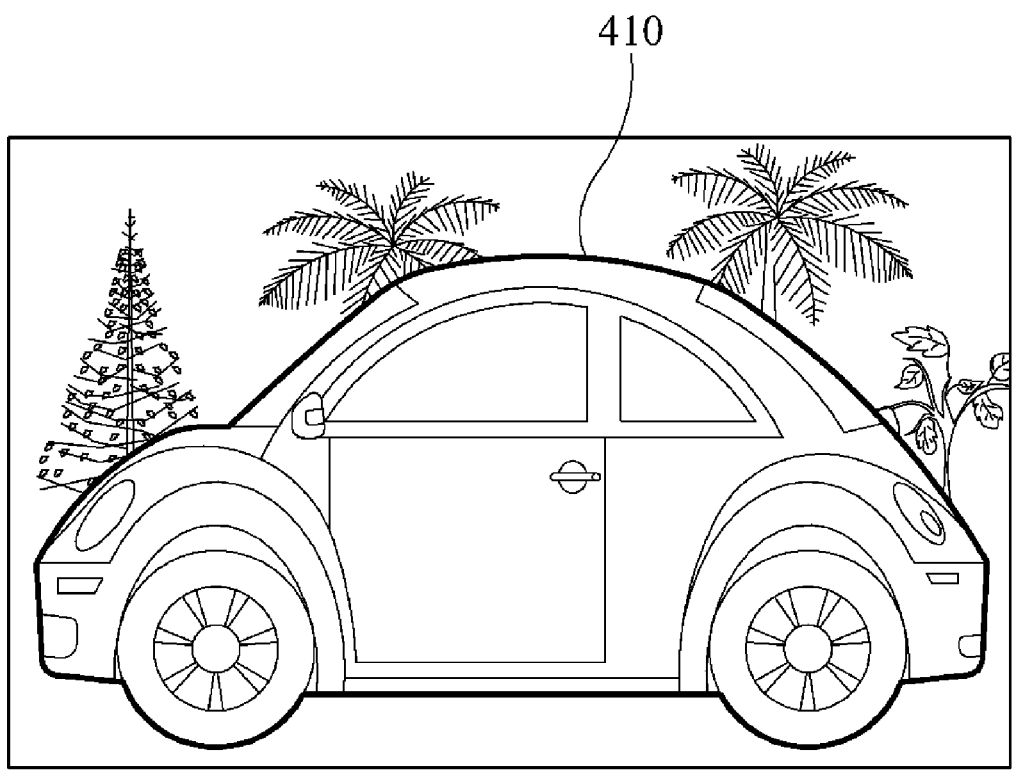
FIG. 4 and FIG. 5 illustrate images in which filter information of an object of interest is included in the object information image shown in FIG. 3 according to an exemplary embodiment of the invention.
Figure 5:
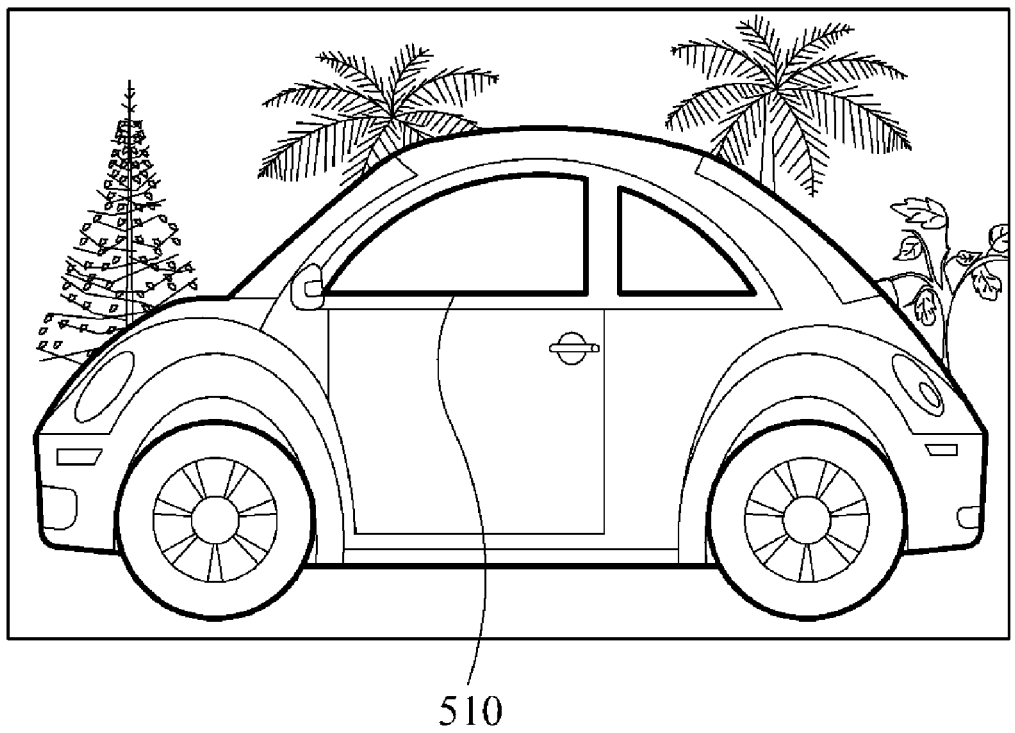
Figure 7:
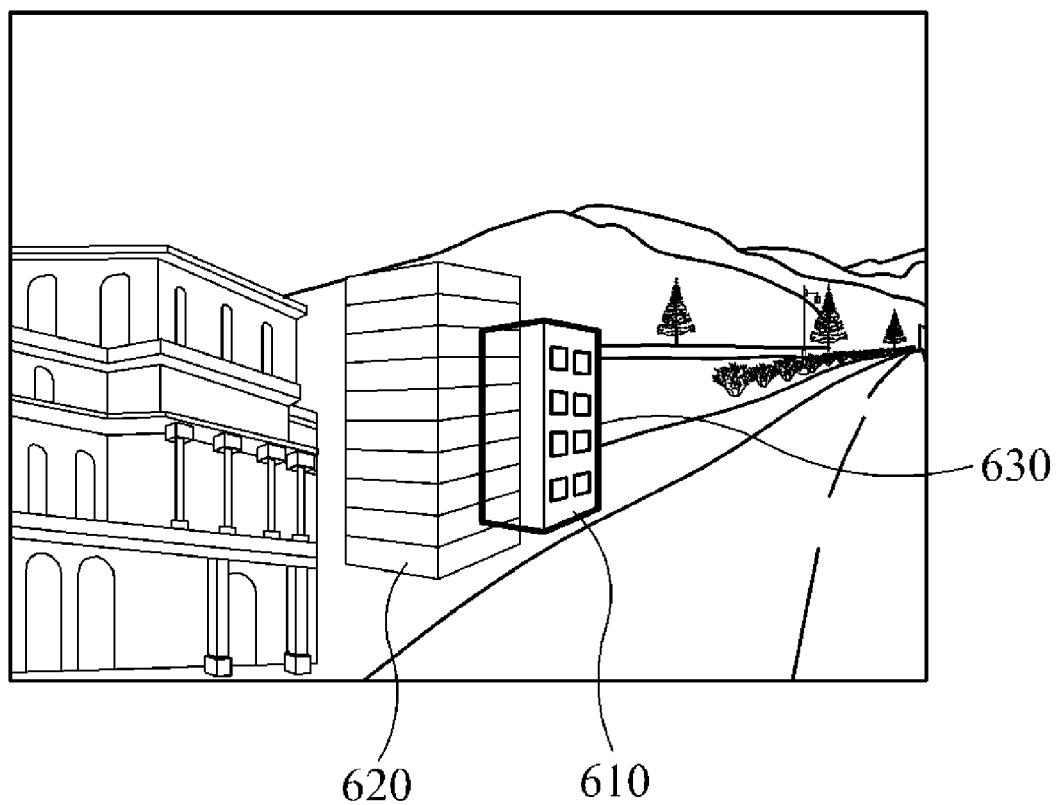
FIG. 7 illustrates an image on which filter information of an object of interest is included in the object information image illustrated in FIG. 6 according to an exemplary embodiment of the invention.

Examples of filter information displayed on a display are illustrated in FIG. 4, FIG. 5, and FIG. 7. Referring to FIG. 4, outline image data showing the outline of a car, which may be inputted by a user, is displayed as filter information.

Also, the filter information may be classified into primary filter information and secondary filter information. For example, as illustrated in FIG. 4, the outline image data 410 of a car, which is an object of interest, may be primary filter information. Further, as illustrated in FIG. 5, the outline of the car window 510, which may be detailed information of the object of interest, may be secondary filter information.

Accordingly, the primary filter information may be general filter information about an object of interest, and if the object of interest can be recognized using primary filter information, the controller 170 may request a user to input secondary filter information to obtain detailed information of the recognized object of interest.

Also, the filter information may include outline image data of objects, which may be estimated by a user at least in part, as well as the outline image data of objects, which may be readily identifiable in a displayed image. For example, as illustrated in FIG. 6, a building 610, which is an object of interest, is partially blocked by another building 620. In this case, as illustrated in FIG. 7, the user may input drawing information 630 showing the entire shape of the building 610 including the blocked part of the building 610, as filter information.

The object recognition information storage 140 stores reference characteristic information of the objects of interest as mapping information for recognizing objects. The reference characteristic information may include information about the shapes, colors, textures, patterns, color histograms and edges of objects of interest. The controller 170 compares object recognition information acquired by applying the filter information with the stored reference characteristic information to determine what the object is, thereby recognizing the detected object of interest.

In an example, the object recognition information storage 140 may be installed in the object recognition apparatus, or may be located outside the object recognition apparatus and transfer data through a network. In the case where the object recognition information storage 140 is located outside the object recognition apparatus, the object recognition information storage 140 may further include a communication interface to conduct network communications.

The metadata storage 150 stores various kinds of information related to the objects of interest. For example, if a certain object is a tree, metadata of the object may be a tag image showing the name, main habitat, ecological characteristics, and other relevant information of the tree. Each piece of metadata may be assigned the same identifier as that assigned to the corresponding object of interest.

The metadata storage 150 also may be installed in the object recognition apparatus, or may be located outside the object recognition apparatus and receive data through a network. In the case where the metadata storage 150 is located outside the object recognition apparatus, likewise, the metadata storage 150 may further include a communication interface to conduct network communications.

The manipulating unit 160 is a user interface that receives input information from a user. The manipulating unit 160 may be an input unit which generates data if a trigger is pressed. The trigger may be a button, a touch sensor, a mouse, or the like. According to an example, metadata, priority information, selection information, etc. may be received through the manipulating unit 160.

The controller 170 controls the respective components described above to perform operation of recognizing objects using filter information. The controller 170 may be a hardware processor or a software module that is executed in the hardware processor. The operation of the controller 170 will be described in more detail with reference to FIG. 2 below.

Although not shown in the drawings, the controller 170 may include various kinds of sensors which provide sensing information (for example, a current time, a current location, a photographed direction, etc.) in order to help object detection and metadata detection for object detection.

Figure 2:
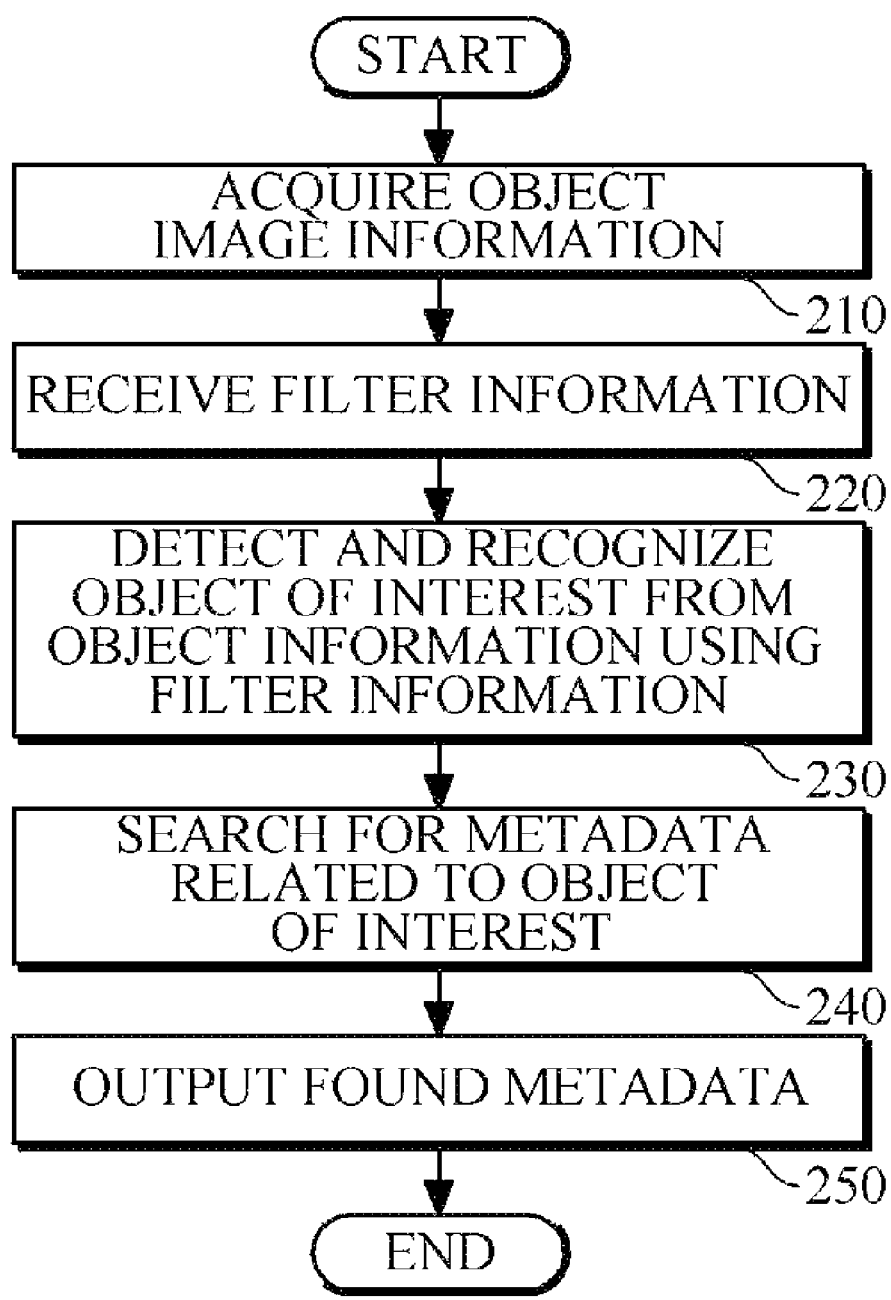
FIG. 2 is a flow chart illustrating an object recognition method using filter information according to an exemplary embodiment of the invention.

Hereinafter, an object recognition method using filter information will be described with reference to FIG. 2. FIG. 2 is a flow chart illustrating an object recognition method using filter information according to an exemplary embodiment of the invention. For convenience, FIG. 2 will be described as if the method were performed by the object recognition apparatus described above. However, the method is not limited as such.

Referring to FIG. 1 and FIG. 2, if an object recognition mode is set by an input from a user, the controller 170 may drive the object information acquiring unit 110 to acquire object information including at least one object of interest (210). The object information may include image information, location information, acoustic information, and the like.

Then, the controller 170 receives filter information (220). The controller 170 may output the first object information through the output unit 120 to allow a user to input filter information, which is not shown in the drawings. For example, if the first object information is an image information, the controller 170 may output the image information on a display screen as illustrated in FIG. 3 or FIG. 6 through the output unit 120.

Then, if a user wants to see metadata of a car included in the image information, he or she may input outline image data, as filter information, showing the outline of a car as illustrated in FIG. 4 in order to facilitate detection of the car as an object of interest. After receiving the filter information from the user, the controller 170 may apply the filter information to the object of interest detected in the displayed image by overlapping the filter information over the detected object of interest.

Then, the controller 170 detects and recognizes an object of interest from the object information using the filter information and the reference characteristic information (230). According to an example, the filter information may be used for two purposes by the controller 170. First, the filter information may be used to detect an object of interest from object image information, in which a plurality of objects may be included. For example, the filter information may be used as information for detecting or selecting a particular building from an image in which many buildings are shown.

Second, the filter information may be used to increase an object recognition rate or an object recognition speed. More specifically, the controller 170 may compare object recognition information, acquired by applying the filter information to the object information, to at least one piece of reference characteristic information from the object recognition information storage 140. This comparison is made to recognize the detected object of interest. In an example, the controller 170 filters at least one piece of object recognition information similar to the filtered reference characteristic information stored in the object recognition information storage 140, and compares the filtered reference characteristic information extracted from the object recognition information storage 140 with the object recognition information detected from the object information to recognize the detected object of interest. Accordingly, it may be possible to reduce a time required for recognition and enhance a recognition rate.

In summary, the controller 170 uses the filter information to detect the object of interest from among the image information, in which a plurality of objects may be included. Then, the controller 170 compares the object recognition information, to the stored reference characteristic information stored in the object recognition information storage 140 to identify the object of interest. More specifically, the controller 170 detects an identifier assigned to the reference characteristic information and maps the same identifier to the detected object of interest. Also, the controller 170 may detect object information based on information sensed from various kinds of sensors.

Meanwhile, the operations 220 through 230 described above may be repeated several times. If object recognition using primary filter information inputted by a user fails, the controller 170 may output a message for requesting the user to input secondary filter information, receive the secondary filter information from the user, and then perform object recognition using the secondary filter information.

However, there may be a case where two or more objects are detected as objects of interest if both the filter information and the object information are used to search for an object of interest from the object recognition information storage 140 in operation 230. In this case, the controller 170 may output the detected results to allow the user to input exact information for selecting an object of interest.

Successively, the controller 170 searches for metadata related to the recognized object of interest (240). For example, the controller 170 may search for an object of interest with the same identifier as that of the recognized object of interest is assigned. At this time, two or more pieces of metadata for an object of interest may be found. Then, the controller 170 may output the found metadata (250). If two or more pieces of metadata are found, the controller 170 may output the metadata according to priority. The priority may be set in advance according to the user's preferences stored in advance or may be received from the user in real time.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An object recognition method using a processor, the method comprising:

acquiring object image information comprising an object of interest;

acquiring, using the processor, filter information for recognizing the object of interest from the object image information; and recognizing the object of interest using the filter information, wherein the filter information comprises outline image data showing an outline of the object of interest, and
wherein the recognizing of the object of interest using the filter information comprises:
  detecting an object recognition information, wherein the object recognition information comprises characteristic information corresponding to the object of interest;
  comparing the object recognition information with a stored reference characteristic information; and
  recognizing the object of interest when the object recognition information matches the stored reference characteristic information.

2. The object recognition method of claim 1, wherein the acquiring of the filter information comprises:
  outputting the acquired object image information;
  receiving an outline image data of the object of interest; and
  outputting the outline image data to overlap the object image information.

3. The object recognition method of claim 1, wherein the filter information comprises detailed information or location information related to the object of interest.

4. The object recognition method of claim 1, further comprising:
  outputting a request to input additional filter information, when the object of interest is not recognized using the filter information;
  receiving additional filter information in response to the request; and
  recognizing the object of interest using the additional filter information.

5. The object recognition method of claim 1, further comprising:
  searching for metadata related to the object of interest; and
  outputting the metadata.

6. The object recognition method of claim 5, wherein outputting the metadata comprises outputting the metadata according to a predetermined priority when two or more pieces of metadata for the object of interest are found.

7. The object recognition method of claim 1, further comprising acquiring metadata related to the recognized object of interest, wherein the metadata is outputted with the object of interest.

8. An object recognition apparatus using filter information, the apparatus comprising:
  a processor;
  a storage device;
  an object information acquiring unit to acquire object image information comprising an object of interest;
  a filter information input unit to acquire filter information, the filter information to recognize an object of interest from the object image information;
  an output unit to output the object image information and the filter information; and
  a controller using the processor to recognize the object of interest in the object image information using the filter information,
  wherein the filter information comprises outline image data showing an outline of the object of interest, and
  wherein the controller detects an object recognition information, the object recognition information comprising characteristic information corresponding to the object of interest, compares the object recognition information with a stored reference characteristic information, and recognizes the object of interest when the object recognition information matches the stored reference characteristic information.

9. The object recognition apparatus of claim 8, wherein the controller outputs the object image information through the output unit and outputs the filter information to overlap the object image information.

10. The object recognition apparatus of claim 8,
  wherein the controller outputs a message requesting additional filter information and receives the additional filter information to recognize the object of interest using the additional filter information, when the object of interest is not recognized using the object information and the filter information.

11. The object recognition apparatus of claim 8, further comprising a metadata storage to store metadata of the object of interest,
  wherein the controller searches for metadata related to the object of interest and outputs the metadata through the output unit.

12. The object recognition apparatus of claim 11, wherein the controller outputs the metadata according to a predetermined priority when two or more pieces of metadata for the object of interest are found.

13. The object recognition apparatus of claim 8, further comprising an object recognition information storage to store reference characteristic information, the reference characteristic information to be compared to the detected object recognition information.

14. The object recognition apparatus of claim 13, wherein object of interest is recognized when object recognition information matches with the stored reference characteristic information.

15. An object recognition apparatus using filter information, the apparatus comprising:
  a processor;
  an object information acquiring unit to acquire image information comprising an object of interest;
  a filter information input unit to acquire filter information, the filter information to recognize an object of interest from the image information;
  an output unit to output the image information and the filter information;
  an object recognition information storage to store reference characteristic information;
  a meta data storage to store detailed information related to the object of interest; and
  a controller using the processor to recognize the object of interest in the image information using the filter information and the reference characteristic information,
  wherein the filter information comprises outline image data showing an outline of the object of interest, and
  wherein the controller detects an object recognition information, the object recognition information comprising characteristic information corresponding to the object of interest, compares the object recognition information with the stored reference characteristic information, and recognizes the object of interest when the object recognition information matches the stored reference characteristic information.

* * * * *